June 10, 1952     S. S. McINTYRE     2,600,065
POWER TRANSMISSION MECHANISM
Filed Nov. 19, 1945     4 Sheets-Sheet 1
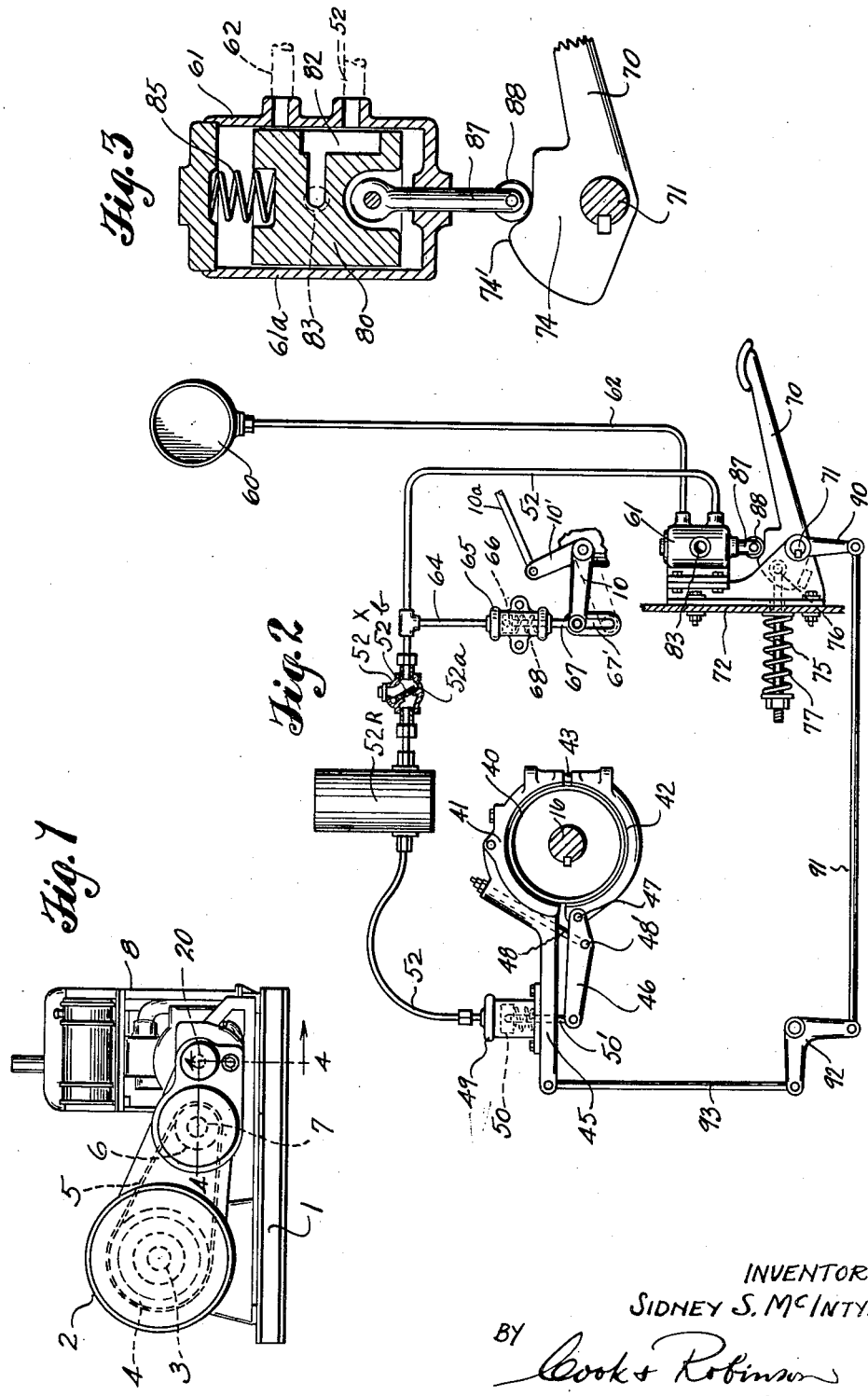
INVENTOR
SIDNEY S. McINTYRE
BY Cook & Robinson
ATTORNEYS

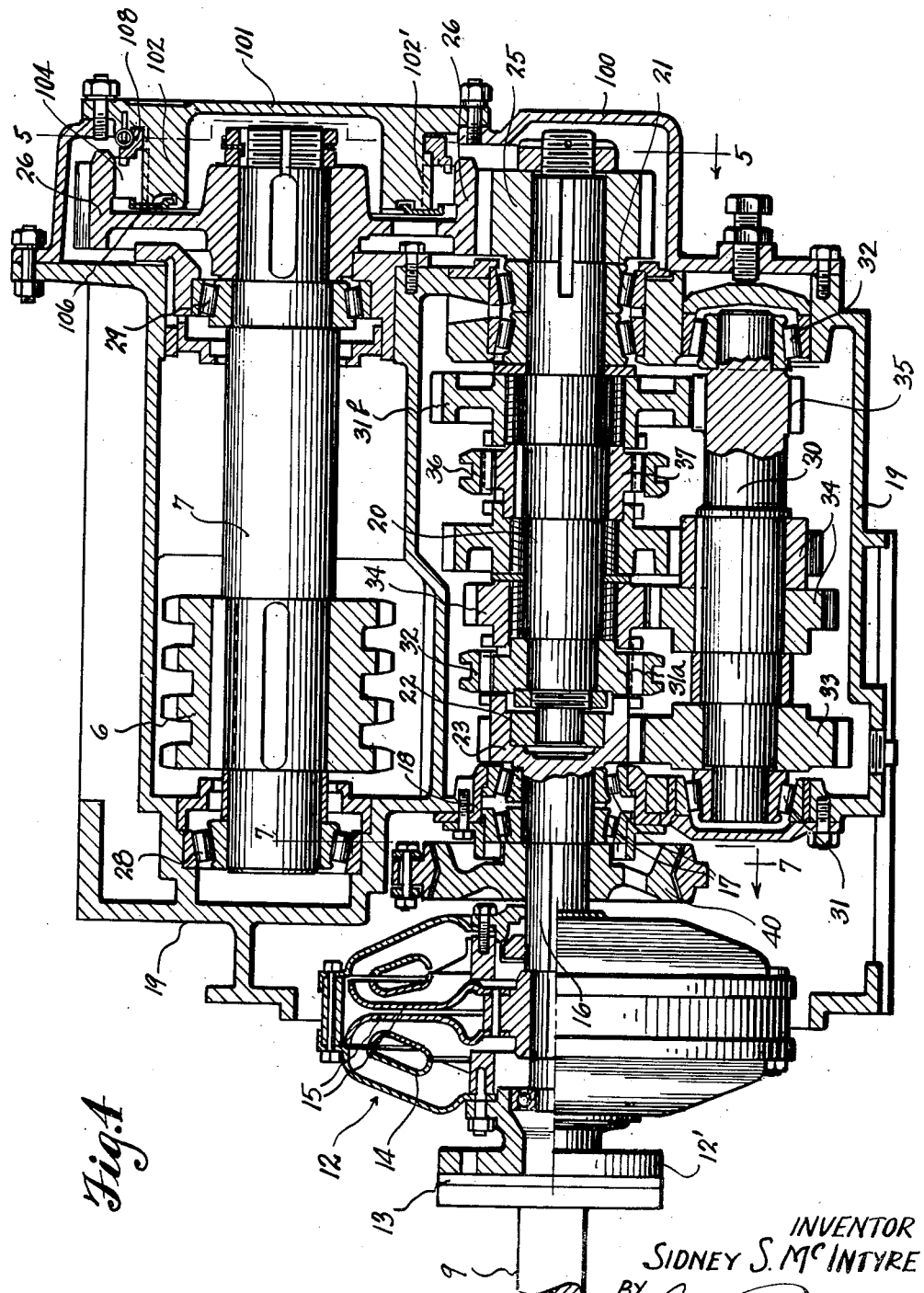

June 10, 1952 S. S. McINTYRE 2,600,065
POWER TRANSMISSION MECHANISM
Filed Nov. 19, 1945 4 Sheets-Sheet 3
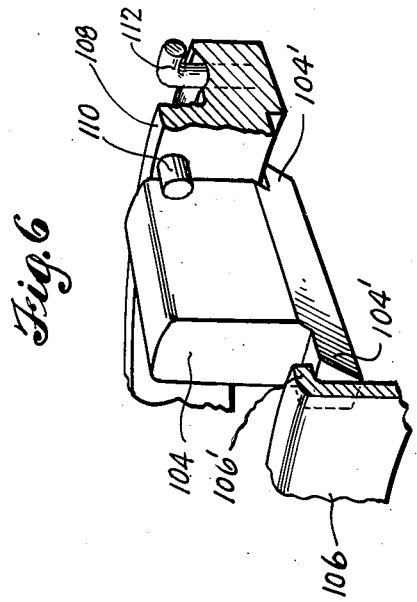
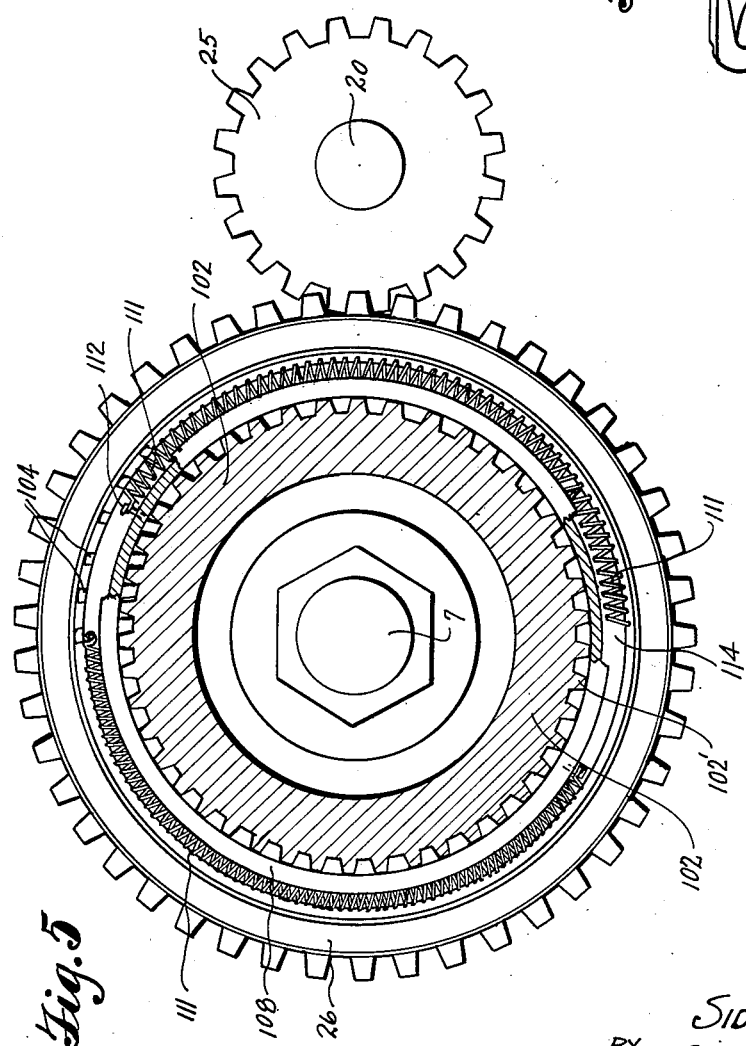
INVENTOR
SIDNEY S. McINTYRE
BY
Cook + Robinson
ATTORNEYS

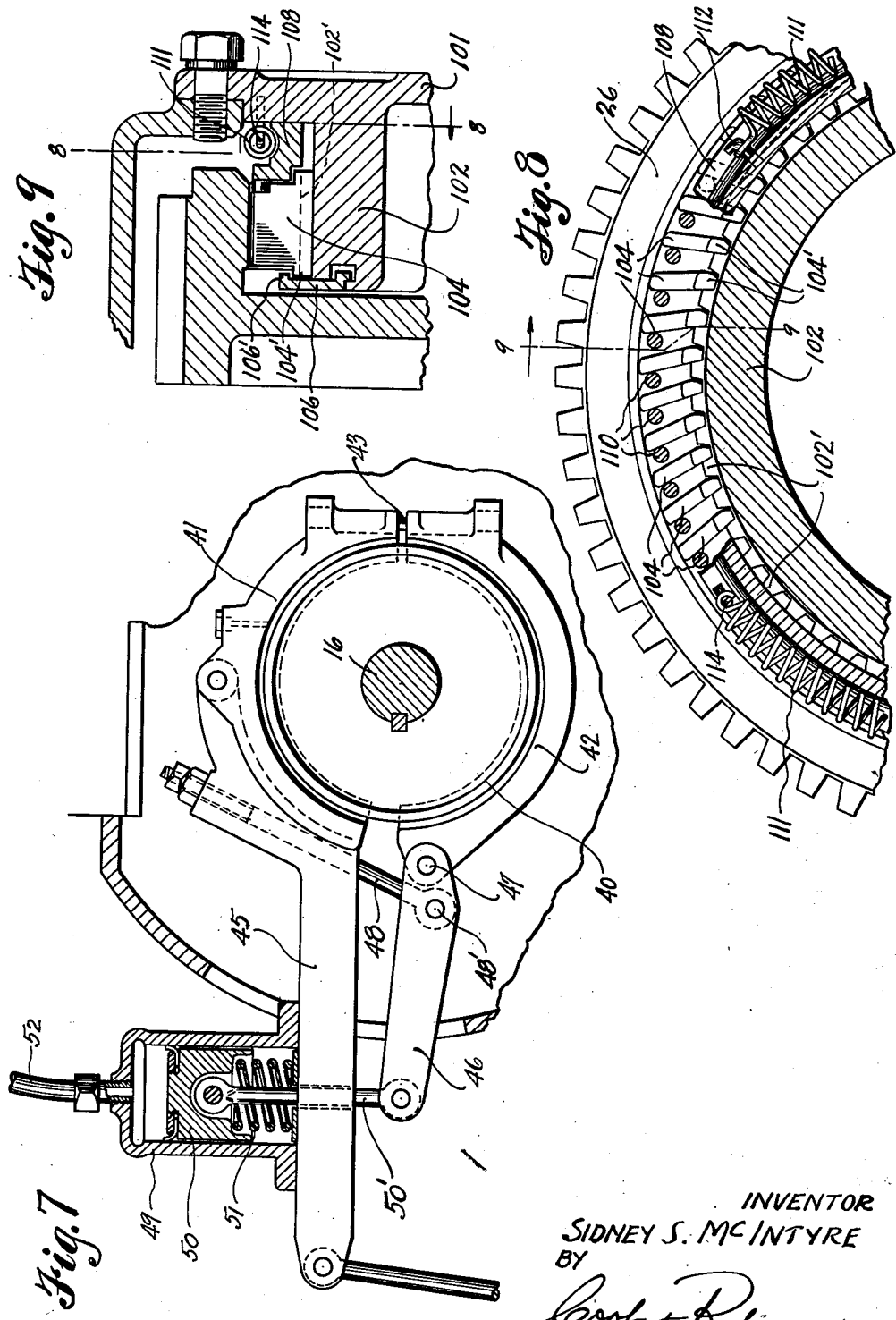

Patented June 10, 1952

2,600,065

UNITED STATES PATENT OFFICE 2,600,065

POWER TRANSMISSION MECHANISM

Sidney S. McIntyre, Sedro-Woolley, Wash.

Application November 19, 1945, Serial No. 629,496

12 Claims. (Cl. 192—.09)

This invention relates to power transmission mechanisms and has reference more particularly to speed changing and power transmission gearing as used in connection with engines of those kinds well known in industry as hoisting engines, and wherein revoluble drums are employed for the winding in of cables for lifting loads and holding them in suspension.

For better understanding of the present invention, it will here be explained that in recent years, hydraulic couplings have been put to many uses. In their various new applications, they have been incorporated in hoisting engines between the source of power, or engine proper, and the speed changing transmission gearing that is employed between the engine and the cable winding drums for changing line or cable speeds. This particular type of coupling, in such an engine, has recognized advantages, one of which is the elimination, to a material extent, of the shocks transmitted to the driving mechanism that are so noticeable when stopping or starting, and incident to gear shifting where engines equipped with the ordinary types of friction clutches are employed. However, there are certain disadvantages in the use of the hydraulic coupling that have not heretofore been overcome, one of such disadvantages being that unless the impeller disk of the hydraulic coupling be completely stopped for the gear shifting operation, the continuing drag between the impeller disk and turbine disks will keep the transmission gears turning with the result that it is extremely difficult to bring the selected gears of the speed changing mechanism into intermeshing alinement so that shifting can be quickly effected; it being well recognized that quick shifting of gears in changing line speeds is an essential to proper operation of the hoist.

Another problem that arises through the use of a hydraulic coupling in such engines is that due to the reverse turning action that is imparted to the transmission gearing whenever the driving speed of the engine is reduced to idling condition; such reverse turning adding to the difficulty of gear shifting and also permitting an undesirable accumulation of slack in the cable connection between hoist and load.

In view of the heretofore mentioned and other disadvantages incident to the use of hydraulic couplings on yarder engines, and for other reasons later explained or readily apparent, it has been the principal object of this invention to provide improvements in engines or power transmission mechanisms of that kind using a hydraulic coupling between the source of power and a speed change gearing that is normally under load whereby that reversing tendency transmitted to the transmission mechanism at idling speeds, is eliminated; whereby the drag transmitted through the hydraulic coupling to the gearing that continues even when the engine is idling and which makes gear shifting difficult, is prevented; and whereby certain gears of the speed changing mechanism may be held or turned slightly in reverse direction as required for easy shifting of gears into intermeshing relationship.

It is also an object of this invention to provide a novel mechanism for the manual control of the application of pressure medium whereby the engine is throttled to idling speed preparatory to a gear shifting operation, and whereby a brake is applied to the primary driving shaft of the transmission gearing to stop its turning under influence of the hydraulic coupling and through which a reverse turning motion may be imparted thereto for an easier shifting of gears.

Still further objects of the present invention reside in details of construction and combination of parts, and in the mode of operation of the engine as will hereinafter be fully described.

In accomplishing these and other objects of the invention, I have provided the improved details of construction, the preferred forms of which are illustrated in the accompanying drawings, wherein—

Fig. 1 is a view showing, in a diagrammatic way, an end view of a hoisting engine that is equipped with improved power transmission mechanism in accordance with the objects of the present invention.

Fig. 2 is a view diagrammatically illustrating the foot pedal control device and associated parts as used in conjunction with the hydraulic coupling, the brake mechanism and engine throttling lever.

Fig. 3 is a longitudinal section of the main control valve for the brake and throttle control system.

Fig. 4 is a longitudinal section of the power transmission gearing embodied by the present invention, showing the connection of hydraulic coupling, speed changing gearing, and cable drum driving shaft; the section being in the flattened out plane of line 4—4—4 in Fig. 1.

Fig. 5 is a cross section taken on line 5—5 in Fig. 4.

Fig. 6 is a perspective view showing details of one of the brake dogs of the one-way brake employed to retain the cable winding drum and transmission gearing against reverse turning.

Fig. 7 is a cross sectional view substantially on line 7—7 in Fig. 4, illustrating details of the brake mechanism used in conjunction with the present coupling and transmission gearing.

Fig. 8 is a sectional detail of the one-way brake herein employed.

Fig. 9 is a cross section on line 9—9 in Fig. 8.

Referring more in detail to the drawings—

In Fig. 1, I have, in a rather general and diagrammatic way, illustrated a hoisting engine of a type for which the present transmission mechanism is especially adapted. In this view, 1 designates the base frame of the hoist and 2 designates a cable winding drum that is mounted in the usual way on the base for its intended purpose. The drum 2 is mounted on a driving shaft 3 equipped with a driving sprocket wheel 4, about which a sprocket chain belt 5 operates to drive the drum. The belt 5 extends about a sprocket wheel 6 that is keyed on a driving shaft 7; these parts, 6 and 7, being parts of the present speed changing mechanism, shown best in Fig. 4, and through which the cable winding drum may be driven at selected speeds.

The source of power, or prime mover, for driving the drum through the mediacy of the present hydraulic coupling and speed changing gearing, is indicated generally at 8 in Fig. 1, and it may be one of any of the well known types, either diesel, gasoline, or steam, the operating speed of which is controlled by the adjustment of a throttle lever, or the like, that controls the admittance or application of fuel charges to the engine. The drive shaft of the engine is designated in Fig. 4 by reference numeral 9, and it is the understanding that this is not at any time driven in a reverse direction.

In a diagrammatic illustration in Fig. 2, a throttle lever is designated by reference numeral 10, and for a better understanding of the present system of control, it will be explained that by swinging this lever 10 upwardly or downwardly about its pivot point, the admittance of fuel to the engine is varied accordingly, thus to cause the engine to produce more or less power. It is herein intended that when the lever 10 is moved to one limit of its adjustment, fuel admission to the engine will be so reduced that the engine will be brought to its idling speed, and that when it is moved away from this position for causing idling, in an opposite direction, the engine speed and power will be increased accordingly.

The engine drive shaft 9 connects with the present power transmission and speed changing mechanism through a hydraulic coupling, which is designated in its entirety, in Fig. 4, by reference character 12. This coupling may be any one of the present-day well known makes of that type comprising a closed housing for a hydraulic medium, and containing cooperatively arranged impeller and turbine disks and wherein power is transmitted from the engine driven impeller disks to the turbine disks through the mediacy of the hydraulic medium. As herein shown, the engine shaft 9 is joined by a flexible coupling member 13 to an end flange 12' of the housing portion of the hydraulic coupling to rotate the latter, and it is to this housing that the impeller disks of the device are attached to rotate therewith for the transmission of power to the turbine disks.

The coupling 12 employed is herein illustrated as of the twin disk type. The impeller disks which rotate with the engine shaft, are designated by reference character 14 and the turbine disks are designated by reference character 15. The turbine disks are keyed on the end of a shaft 16 which is a part of the present transmission mechanism and is rotatably supported through the mediacy of anti-friction bearings, designated at 17 in Fig. 4, within an end wall mounting 18 of the transmission gear housing, which housing is designated in its entirety by reference character 19. The shaft 16 is hereinafter referred to as the primary drive shaft of the speed changing gearing.

The shaft 16 is mounted in coaxial alinement with a continuing shaft 20, which is a part of the speed changing mechanism and hereinafter referred to as the secondary shaft, and this latter shaft is rotatably supported in the transmission housing 19 by anti-friction bearings designated at 21 and 22; the latter bearing 22 being contained coaxially within the body of a gear wheel 23 that is formed on the inner end of shaft 16 as an integral part thereof. Keyed on the shaft 20, at its outer end, is a gear pinion 25 that operates in driving mesh with a larger gear wheel 26 that is keyed on one end portion of the previously mentioned shaft 7 on which the sprocket 6 is keyed; the shaft 7 and sprocket 6 being best shown in Fig. 4, wherein, for better understanding and easier illustration, the shaft 7 and parts associated therewith have been rotated about the axis of shaft 20 into a plane that coincides with the vertical plane of shaft 20 as illustrated in Fig. 1.

The shaft 7, as observed in Fig. 4, is rotatably mounted by anti-friction bearings 28 and 29 fitted in bearings therefor provided in the gear housing 19, and the gear wheel 26 is keyed on an end portion of shaft 7 that extends beyond the bearing 29.

Associated with the axially alined shafts 16 and 20, as illustrated in Fig. 4, and axially parallel thereto, is a countershaft 30. This is rotatably supported at its ends in anti-fraction bearings 31 and 32 fitted in the housing 19. Keyed on this countershaft is a gear wheel 33 which at all times is in operative mesh with the gear wheel 23 on the shaft 16.

Assembled on the shafts 20 and 30 are the various speed changing gear wheels 34 that are arranged as ordinarily used in transmission mechanism for the changing of gear ratios and driving speed. Such changes may be effected in the usual way and through the usual gear shifting means which is not a part of this invention, nor is it believed necessary to describe in detail; it being understood that through the mediacy of conventional gear shifting devices, the driving speed of shaft 20 may be changed as desired or required under the conditions of operation at any specific time.

It is observed in Fig. 4 that gear 31a is keyed on an end of shaft 20 adjacent gear wheel 23 and that an internal gear-toothed collar 32 is intermeshed with and is adjustable in its axial direction on gear 31a to effect a locked driving connection between gear 23 and the gear 31a, thus to provide a direct driving connection between shaft 16 and shaft 20 and thus direct to gear 25. When collar 32 is shifted in the clear of its connection with gear wheel 23, to a neutral position, then driving is through gears 23 and 33 to counter shaft 30, from which power may then be transmitted through a relatively small gear 35 thereon to a larger gear wheel 31b revoluble on shaft 20. This gear 31b may be locked relative to shaft 20 by the shifting of a clutch collar 36 into mesh therewith. The collar 36 is mounted in sliding mesh with a gear 37 which in turn is keyed on shaft 20. Thus another driving speed for gear 25 is obtained.

It is not the intent to claim anything new in this provision of means for changing gear ratios between driven gear 23 and gear 25, but merely, by the above explanation, to disclose a mechanism in which a change of gear ratio may be accomplished by the shifting of gears and to give a better understanding of the use in such a mechanism of novel devices hereinafter to be described, and the use of which is made necessary or desirable by reason of the interposing of the hydraulic coupling between the engine and speed changing gearing.

In using the present equipment, should the operator desire to change the driving speed of the cable winding drum, this may be accomplished through the shifting of gears of the speed changing mechanism and it is a requirement that, preparatory to this, the engine be slowed down to its idling speed. However, when the primary drive shaft 16 is driven through a hydraulic coupling of the type shown, even though the engine be operating at its idling speed, there is still a slight driving influence imparted by the impeller disks through the hydraulic medium to the turbine disks and thus to the shaft 16. This is well understood by those familiar with such couplings. This driving action, slight as it generally is, makes it extremely difficult, if not impossible, to shift gears to obtain a change of driving speed. However, in accordance with this invention, this gear shifting difficulty can be avoided if, upon reducing the engine to idling speed, the shaft 20 is held against turning in its reverse direction and shaft 16 is held against turning in its forward direction, and also, if necessary, rotatably moved in a reverse direction a slight interval as may be required to bring gears into intermeshing alinement for shifting.

To accomplish the holding of the shaft 16 against forward turning and to effect its slight reverse turning, I have provided a foot brake mechanism and novel controls therefor, best shown in Figs. 2, 4 and 7, which operate in conjunction with means for bringing the engine to idling speed preparatory to making any change in line speed. In Figs. 8 and 9, I have shown details of the automatic one-way brake for holding the drum shaft 7 against reverse turning when the engine is idling and to facilitate the shifting of gears. First describing the foot brake mechanism and its controls:

The mechanism, as best shown in Figs. 2 and 7, comprises a brake drum 40 that is keyed on the primary drive shaft 16 adjacent the hydraulic coupling, and a pair of brake shoes 41 and 42 associated therewith in the usual manner with ends operatively joined at one side of the drum by a connecting bolt 43 that is applied to oversize holes in these parts. Fixed to the shoe 41 at the upper side of the drum, and extending laterally therefrom, is a lever arm 45, and below this is a shorter lever 46 having one end pivotally connected at 47 to the adjacent end of the brake shoe 42, and having a pivotal connection at 48' with a bolt 48 that is fixed in lever 45.

Fixedly mounted on the lever 45, near its outer end, is an air cylinder 49 containing a piston 50 connected by a link 50' with the outer end of the lever 46. A coiled spring 51 contained in the cylinder urges the piston toward retracted position, and by this action on levers 45 and 46, yieldingly retains the brake shoes released from the drum. An air pipe 52 connects to the closed outer end of the air cylinder for the admittance of air under pressure thereto, under valve control as will later be described. When air pressure is admitted to the cylinder 49, the piston will be actuated downwardly to effect an application of the brake to thus hold the drum 40 and shaft 16 against rotation; the brake actuation being effected through the movement of piston 50, link 50' and lever 46 and through the connection of lever 46 with the brake shoes.

The compressed air utilized in accomplishing the above brake operation, is supplied from a suitable tank or other source such as designated at 60 in Fig. 2. Air under pressure is supplied from tank 60 to a main control valve 61 through a pipe line 62 and from the valve 61, it may be administered thereby to the line 52, previously mentioned, that leads from valve 61 to the air cylinder 49.

In accordance with the present invention, the application of the brake to hold the shaft 16, is preceded by the actuation of the throttle lever 10 to a position that reduces the engine to idling speed. This actuation of the throttle lever to idling position is accomplished as follows:

Leading off from the pipe line 52 is a branch line 64 that connects to a small air cylinder 65 containing a piston 66 therein. This piston is connected by a link 67 through a pin and slot connection as at 67' with the throttle lever 10 of the engine, as best seen in Fig. 2. This pin and slot connection is such as to permit manual actuation of the throttle lever independently of the automatic action. For this independent action, I provide a lever arm 10' and link 10a that extends to a suitable operating lever or pedal.

A coiled spring 68 in the cylinder operates to yieldingly urge the piston to its retracted position, but when the piston is extended by the application of air pressure into line 52 and cylinder 65, it actuates the throttle to that position that results in bringing the engine to its idling speed.

The admission of air to the line 52 through the valve 61 is under control of a foot pedal 70 that is pivotally mounted by a pivot shaft 71 on a supporting beam 72, on which beam the valve 61 also is fixed in a position directly above the foot pedal mounting. The pedal 70 has a cam head 74 at its mounting end through the mediacy of which the valve 61 is controlled, as presently explained. A link 75 has one end pivotally fixed as at 76 to the cam head and extends through and beyond the beam 72 and on that end, mounts a coiled spring 77 thereabout. This spring is held under compression through the link connection to yieldingly hold the outer or free end of the foot pedal in a lifted position.

The control valve 61, as seen in Figs. 2 and 3, comprises the valve cylinder 61a in which a valve piston 80 is slidably contained. The air pipe lines 52 and 62 open into ports in a side of the cylinder and the valve piston has a channel 82 along one side adapted to provide communication between these two air lines when the piston is actuated to the brake applying position, and to provide communication between the line 52 and an exhaust port 83 in the cylinder when it is at its other limit of travel, which is its normal position.

The movement of the valve piston is under control of a spring 85 that is contained in the valve cylinder and bears against the piston to urge it toward normal position, and the cam head 74 on the foot pedal that, upon depression of the pedal, actuates the piston to its other position for admitting air to the line 52; it being shown in Fig. 3 that the piston valve has a stem 87 extended from the cylinder end equipped with a roller 88 at its end which rides on the cam head 74.

Normally, the foot pedal is in a raised position, and the piston valve is in that position at which it is closed against admission of air from line 62 to the brake and throttle actuating cylinders. However, upon depression of the foot pedal, an initial interval, a rise 74' of the cam head actuates the valve piston upwardly, thereby to close the exhaust port 83, then to open the air supply pipe 62 to the line 52 and to the two air cylinders, 65 and 49, first causing actuation of the throttle lever with a resultant idling operation of the engine, then the application of the brake devices to stop rotation of the shaft 16.

It is quite desirable that upon the actuation of the foot pedal 70 preparatory to a gear shifting operation, that a certain time interval elapses during which the engine can slow down to idling speed before the shaft braking action takes place. Therefore, I have interposed a check valve 52x in line 52 between its point of connection with cylinder 49 and pipe 64, and between this valve 52x and the cylinder 49, have interposed a rather large reservoir 52R.

The check valve is of a type that opens freely for instant exhaust from the cylinder (see Fig. 2), but its valve element 52a is formed with a small orifice 52b for application of air. The time required for air to flow through this orifice to fill the reservoir 52R and cylinder 49 is thereby so increased that braking is delayed as may be found desirable, beyond the almost instant functioning of the throttle lever.

The holding of the shaft 16 might in many instances be sufficient for gear shifting. However, the shifting must be quick and positive, and this can be greatly expedited if the gears that are to be intermeshed happen to stop out of alinement, by a slight reversing action or turning of the shaft 16. This is made possible by the provision of connecting linkage between the foot pedal 70 and brake lever arm 45, shown in Fig. 2, wherein it is shown that through the mediacy of a lever arm 90 fixed on the pivot shaft 71 of the foot pedal, a link 91, bell crank 92 and linkage 93, the depression of the foot pedal beyond that required for opening the air line to apply the brake will cause the brake shoes and drum, as a unit, to be rotatably advanced, thus turning the shaft 16 accordingly in a direction reverse to its normal driving direction. This reverse turning will bring the gears into that necessary alinement for the easy shifting of the selected internally toothed collar to obtain the desired driving speed.

The reverse turning of shaft 16 is by reason of the fact that, when the foot pedal is depressed for this purpose, the brake has already been applied and the brake drum is locked relative to the brake lever 45 to which link 93 is attached.

The application of the brake mechanism and reverse rotation of the shaft 16 is accompanied by the functioning of the automatic brake for holding the shaft 20 against rotation in a reverse direction under the influence of the pull of the cable on the cable winding drum. This holding of the shaft 20 is accomplished through the use of a novel, automatic, one-way brake mechanism which is shown best in Figs. 5, 8 and 9. This will now be described:

As was previously explained, the gear pinion 25 on shaft 20 is in driving mesh with a relatively large gear wheel 26 that is keyed on shaft 7. As best understood by reference to Fig. 4, the gears 25 and 26 are contained within a housing 100 that is bolted to the end wall of housing 19 beyond which the gears are located. This housing 100 has a circular opening in concentric relationship to the axial line of shaft 7 and secured over this is a cover plate 101 with which there is formed an integral, inwardly projecting, annular flange 102 that is spaced from and located concentrically within the flange of gear 26; the relationship of these parts being best shown in Figs. 4 and 9. The flange 102 is formed entirely thereabout with uniformly spaced teeth 102' resembling the teeth of a gear wheel.

Interposed between the toothed flange 102 and the projecting flange of gear 26, are the brake dogs 104. As seen in Fig. 8, each dog 104 has its inner end pivotally seated between adjacent teeth 102' of flange 102. The outer end of each dog has rubbing contact with the inner surface of the flange of gear 26 when it is turning in a forward direction and is adapted to holdingly engage against the flange to prevent rotation of that gear in a reverse direction; that is, in the direction opposite that for causing the winding in of a cable on the drum.

Each dog comprises a rectangular bar, as noted in Fig. 6, formed at opposite ends of its lower edge portion with projections 104'. A ring 106 is applied to the inner end of gear 102 and this has an inturned flange 106' that overlies the projections 104' to hold that end of the dog in place. Likewise, an annular band 108 is applied about the gear at the outer ends of the dogs and this engages the extension 104' at that end to hold the dogs in place. The dogs are of such an exact length and are so inclined that with the gear 26 being driven in one direction, the flange of gear 26 merely slides over their outer ends. However, if gear wheel 26 should start to turn in a reverse direction, they immediately grip the flange with a resultant wedging action, that stops and prevents the gear 26 from turning.

In order that all the dogs will become instantly effective in this braking operation, the annular band 108 is equipped on its inside face with projecting pins 110, each to engage a tooth, and coiled spring 111 are applied about the ring and with ends attached thereto, as at 112 in Figs. 8 and 9, and with their other ends attached to the plate 101 as 114. These springs urge the ring in such direction that through the pins 110, all teeth are urged to holding position. However, the amount of pressure has no retarding effect on the gear 26 when driven in its normal direction.

It will be understood then that whenever the engine is throttled down to its idling speed for gear shifting, the hydraulic coupling becomes ineffective for holding the drum against reverse turning under the pull of the cable thereon. This is especially true if the cable is under loaded condition. Such reverse turning is undesirable and will be prevented through the automatic action of the above described brake mechanism which becomes instantly effective.

By holding the gear wheel 26 against turning, the shaft 20 also will be held due to the intermeshing of gear 26 with gear 25 that is fixed on shaft 20. With shaft 20 held against turning, then the shiftable clutch collars of the speed changing mechanism are more easily alined with the gears over which they are to be shifted.

Assuming the engine to be so equipped with hydraulic coupling, one-way brake and controls as described, and assuming that an operator, in hoisting a load by the winding in of a cable on the cable drum, desires to change line speed, he merely depresses the foot pedal 70 slightly as required to effect the idling of the engine and the almost coincident application of the brake to hold shaft 16. With the reduction of the engine to idling speed and discontinuance of driving power to the cable drum, if there is any reversing force applied to shaft 7 through cable pull, this is instantly checked by the one-way brake.

As soon as the foot brake is applied, the operator manipulates the gear shifting lever, and by touch or the feeling that comes through experience, he engages the clutch elements and this operation is made easy and is quickly accomplished by the depressing of pedal 70 to reverse the turning of shaft 16 to the extent necessary to aline the gears for the shifting operation.

Thus, by the means described, the difficulties of gear shifting, where change speed gearing is used in conjunction with hydraulic couplings, is overcome. While the present improvements have been described in connection with a hoist, it is not to be implied that the invention is to be confined thereto, but to the contrary, it is anticipated that these improvements may be applied wherever a hydraulic coupling is employed between a prime mover or engine and a speed changing gearing that operates under load or where there is difficulty in bringing gears into alinement for the gear shifting operation.

Having thus described my invention, what I claim as new therein and desire to secure by Letters Patent is:

1. In combination, an engine that is operable at working and idling speeds, a throttling lever for the engine and an engine driven shaft, a hoist driving shaft, a unitary speed changing transmission mechanism comprising a secondary shaft positively geared to the hoist driving shaft, a primary shaft and change speed gears connecting the primary shaft with the secondary shaft, a hydraulic coupling connecting the engine shaft and the primary shaft of the said speed changing transmission mechanism, a braking mechanism for the said primary shaft, a fluid motor for moving the throttling lever from working to idling position, a fluid motor for actuating the braking mchanism, a source of fluid pressure medium, a pressure line connecting the said source and said motors and a manually controlled valve interposed in the line for controlling the application of pressure medium to the motors.

2. Apparatus as in claim 1 including a time delay means in the pressure line connection with the brake actuating motor to delay the braking action until after the engine has been brought to idling speed by actuation of the throttling lever.

3. In combination, a cable winding drum with cable wound thereon and normally under unwinding tension, a drive shaft for the drum, an engine that is operable at working and idling speeds and having a drive shaft, a unitary speed changing mechanism comprising a secondary shaft positively geared to the drum driving shaft, a primary shaft and speed changing gears connecting the primary shaft with the secondary shaft, a hydraulic coupling operatively connecting the drive shaft of the engine with the primary shaft of the said speed changing mechanism, an engine throttling lever and a fluid motor for its actuation to control normal working of the engine, a braking means for the primary shaft of the speed changing gearing, a normally inactive motor for actuation of the throttling lever, a normally inactive fluid motor for energizing the braking means, a fluid pressure supply line for said motors having a normally closed valve for controlling the application of fluid medium to the line, a manually operable control lever for opening said valve to energize the motors, and means in the line to delay the flow of pressure medium to the motor of the braking means.

4. In combination, a cable winding drum with cable wound thereon and normally under tension an engine that is operable at working and idling speeds, a manually operable throttle for controlling said speeds, a drum driving shaft, a unitary speed changing gearing having its secondary shaft positively geared to the drum driving shaft, and a primary shaft and speed changing gears connecting the primary shaft with the secondary shaft, a hydraulic coupling connecting the engine shaft with the primary shaft of the speed transmission mechanism, a braking means for the said primary shaft, a lever that is manually movable to instigate the functional operations of the throttling lever to idle the engine and the functioning of the braking means, and a one-way brake associated with the hoist shaft to prevent reverse turning under influence of a suspended load.

5. In combination, an engine having a drive shaft that is selectively operable at working and idling speeds, a drum driving shaft, a driving connection between the engine shaft and drum driving shaft including a hydraulic coupling and a one-way brake associated with the driving connection for holding the drum driving shaft against reverse rotation under influence of a suspended load when the engine drive shaft is operating at idling speed.

6. A combination as recited in claim 5 wherein the driving connection includes a gear wheel formed with an annular flange and said one-way brake includes pivoted dogs mounted to ride on said flange when said gear is being driven by the engine and to automatically grip the flange to prevent turning in a reverse direction under influence of the load on the hoist.

7. In combination, a hoist including a cable winding drum with cable wound thereon and normally under unwinding tension, an engine adapted to operate at working and idling speeds, a throttle lever from the engine movable to different positions for working and idling operations, a drum driving shaft, a driving gear on the shaft, a unitary speed changing mechanism comprising a secondary shaft positively geared to the said gear on the drum driving shaft, a primary shaft, and speed changing gears connecting the primary and secondary shafts, a hydraulic coupling connecting the engine shaft with the primary shaft of the change speed mechanism, a braking means for said primary shaft, normally inactive motors for actuating the throttle from working to idling position and to functionally actuate the braking means, a manual control for energizing the motors and a one-way brake associated with the gear of the hoist driving shaft adapted to automatically engage therewith on reverse turning of the shaft.

8. A combination as recited in claim 7 including means operable by the said manual control to effect a rotative adjustment of the said primary shaft to facilitate gear shifting when the engine is operating at its idling speed.

9. In combination, a hoisting drum, a cable wound thereon and normally under tension tending to turn the drum in a reverse direction, a drum driving shaft, an engine having a drive shaft, a speed changing mechanism for the drum driving shaft including a primary shaft, a secondary shaft in geared connection with the drum driving shaft, and speed changing gears operatively connecting said primary and secondary shafts, a hydraulic coupling connecting the engine drive shaft and the said primary shaft, an engine throttling member movable between positions for causing the engine to operate at working and at idling speeds, a normally released braking mechanism for the said primary shaft, controllable powered means for application of the braking mechanism and for shifting the engine throttling member from engine working to idling speeds, and a manually operable control member for the said powered means.

10. In combination, a hoisting drum, a cable wound thereon and normally under tension tending to turn the drum in a reverse direction, a drum driving shaft, an engine having a drive shaft, a speed changing mechanism for the drum driving shaft including a primary shaft, a secondary shaft with geared connection with the drum driving shaft, and speed changing gears operatively connecting said primary and secondary shafts, a hydraulic coupling connecting the engine drive shaft and the said primary shaft, an engine throttling member movable between positions for causing the engine to operate at working and at idling speeds, a normally released braking mechanism for the said primary shaft, adapted to be holdingly clamped thereto for the braking operation and to be rotatively adjusted when so clamped to effect limited rotatable movement of the shaft, power means energizable for the actuation of the braking mechanism and for movement of the throttling member from working to idling position, a control member for the power means, a manually movable control member operatively connected with the control member of the power means and with the said braking mechanism and movable from "on" position through an initial interval to energize the power means to actuate the throttling member from working to idling position, and to functionally actuate the braking means, and movable through an additional interval to effect a rotary adjustment of the braking means and a like rotary movement of the said primary shaft to facilitate shifting of the speed changing gears.

11. A combination as recited in claim 10 wherein the said manually movable control member has a positive connection with said braking mechanism for its rotative adjustment and said braking mechanism is effective for rotary adjustment of the said primary shaft only when the braking mechanism is clamped thereto.

12. A combination as recited in claim 9 wherein the said powered means comprises individual actuators for the said throttling member and the braking mechanism, and a means associated with the powered means and actuator for the braking mechanism whereby said braking mechanism is caused to function immediately subsequent to the actuation of the throttling member to engine idling position.

SIDNEY S. McINTYRE.

REFERENCES CITED

The following references are of record in the file of this patent:

UNITED STATES PATENTS

| Number | Name | Date |
|---|---|---|
| 1,829,478 | Ehemann et al. | Oct. 27, 1931 |
| 1,978,172 | Sinclair | Oct. 23, 1934 |
| 2,102,755 | Sinclair | Dec. 21, 1937 |
| 2,185,636 | Kysor | Jan. 2, 1940 |
| 2,276,862 | Peterson et al. | Mar. 17, 1942 |
| 2,353,137 | Banker | July 11, 1944 |